United States Patent [19]

Treiber

[11] Patent Number: 4,944,135
[45] Date of Patent: Jul. 31, 1990

[54] PACKAGE WRAPPING AND WEIGHING SYSTEM

[75] Inventor: Fritz F. Treiber, Centerville, Ohio

[73] Assignee: Hobart Corporation, Troy, Ohio

[21] Appl. No.: 323,582

[22] Filed: Mar. 14, 1989

Related U.S. Application Data

[63] Continuation-in-part of Ser. No. 87,924, Aug. 21, 1987, Pat. No. 4,825,626.

[51] Int. Cl.⁵ .................................................. B65B 11/18
[52] U.S. Cl. .......................................... 53/502; 53/228; 53/441; 53/556; 198/464.2; 198/572; 198/575; 198/718
[58] Field of Search ................. 53/502, 228, 230, 556, 53/441; 177/5, 4, 3; 198/464.2, 718, 575, 572

[56] References Cited

U.S. PATENT DOCUMENTS

| | | | |
|---|---|---|---|
| 4,415,048 | 11/1983 | Teraoka | 53/502 X |
| 4,548,024 | 10/1985 | Fine | 53/502 |
| 4,674,269 | 6/1987 | Denda | 53/502 |

Primary Examiner—James F. Coan

[57] ABSTRACT

Packages to be wrapped, weighed and labeled are fed manually into an infeed station of a wrapping and weighing machine from an operator's position. A conveyor then carries them to a wrapping station. The packages are automatically wrapped at the wrapping station and returned to a weighing scale positioned above the infeed station at the operator's position where the packages are weighed and a label is printed adjacent the weighing scale and within convenient reach of the operator. The label is then manually applied by the operator as the wrapped and weighed package is removed from the scale. The wrapping station engages in continued cyclic operation so long as there are any packages in the machine. However, the conveyor operates on a demand basis in response to the placement of packages into the infeed. When a package is sensed, the conveyor goes through one operating cycle in synchronism with the operation of the wrapping station.

6 Claims, 5 Drawing Sheets

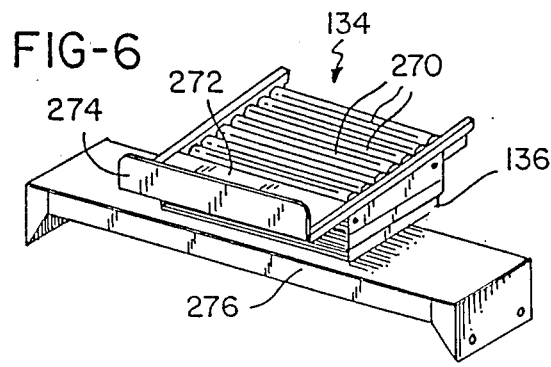
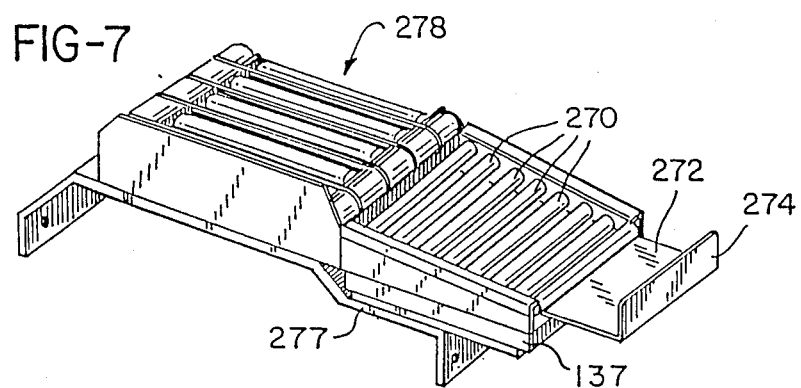
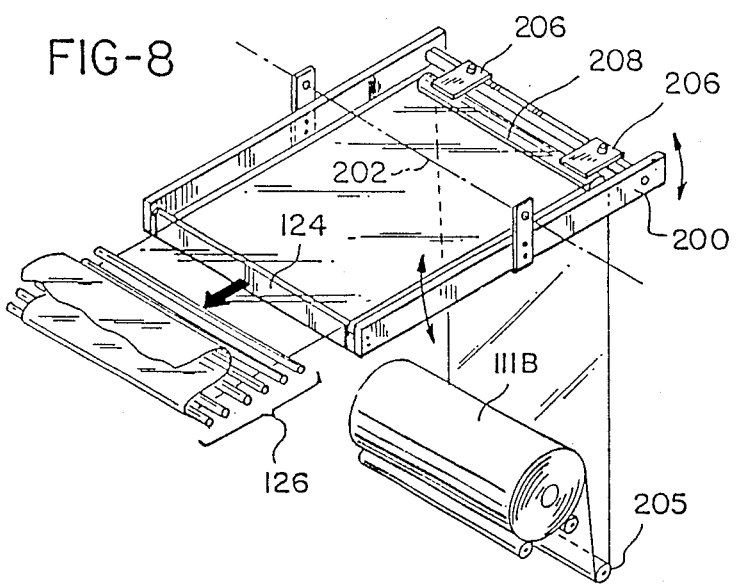

PACKAGE WRAPPING AND WEIGHING SYSTEM

CROSS REFERENCE TO RELATED APPLICATION

This application is a Continuation-In-Part of Ser. No. 07/087,924 filed Aug. 21, 1987 now Pat. No. 4,825,626.

BACKGROUND OF THE INVENTION

This invention relates generally to packaging machines for wrapping stretch film around products supported upon trays, and more particularly, to a package wrapping and weighing machine which receives products to be wrapped at a first level infeed station, automatically wraps the products and delivers them to a weighing station above the infeed station such that the wrapped and weighed products can be hand-labeled by an operator positioned at the infeed station.

Trayed products, for example, meats and produce in supermarkets, are presently packaged in a variety of ways. The simplest, least expensive wrapping arrangement for low volume is a hand-wrap station which permits an operator to wrap sections of stretch film manually about products which are then weighed and labeled. Some hand-wrap stations include weighing scales as the wrapping platform to increase the productivity and speed of operation. For higher volumes, wrapping machines are available for wrapping trayed products, with the wrapped products then being weighed and labeled either by hand or by means of automatic weighing and labeling equipment.

In order to conserve space, weighing scales and label printers/appliers have been incorporated into wrapping machines. Examples of one form of resulting packaging system are illustrated in U.S. Pat. Nos. 4,415,048, 4,458,470 and 4,548,024. The packaging systems disclosed in these patents locate a weighing scale in the package infeed at one end of the wrapping machine, and a label printer and applier along the wrapped package outlet at the opposite end of the machine. Another integrated packaging system is disclosed in U.S. Pat. No. 4,543,766 wherein a weighing conveyor extends between a package infeed station and a wrapping station of a package wrapping machine. A label printer is positioned to pass labels to a labeling head incorporated into a package holddown of the wrapping machine such that package weighing and labeling cooperatively interrelate to simplify the operating procedures required for the previously-noted integrated packaging systems.

Unfortunately, the prior art packaging systems, which combine weighing and labeling with a wrapping machine, do not permit the weighing scale conveniently to be used for hand weighing separate and apart from the wrapping operation. This is due to the location or integration of the scale into the wrapping machine such that it is not readily available to the operator. This problem is apparent from U.S. Pat. Nos. 4,458,470 and 4,548,024 which provide an auxiliary scale platter on the side of the wrapping machine adjacent the label printer.

The prior art designs also preclude the possibility of utilizing one of these machines as an intermediate machine between a hand-wrap station and a fully automated packaging system due to the substantial separation of the weighing scales and the label printers. An intermediate machine would permit an operator to automatically wrap and weigh packages, and conveniently hand-label them in a single operation and from a single operating position. Such an intermediate machine would handle volumes between the low volume appropriate for a hand-wrap station and the high volume appropriate for a fully automatic packaging system at a machine cost which would also be intermediate the two.

A potentially more important problem of the noted prior art packaging systems which perform weighing before wrapping and labeling should be apparent upon viewing a typical wrapping machine within a supermarket produce or meat department. Small portions of meat and produce are found on and around the elevators of such machines. By weighing trayed products prior to wrapping, the weights include any product which may fall from the tray prior to or during the wrapping operation. Accordingly, the weights and corresponding prices indicated on the labels which are ultimately applied to the packages are for the full complement of product originally within the tray prior to wrapping even though a small portion may be dislodged prior to or during the wrapping operation. In this event, the prices charged to the consumer are over the actual prices for the product contained within the wrapped packages.

It is thus apparent that the need exists for a package wrapping and weighing machine which can serve the need of packagers whose requirements are between the capabilities of hand-wrapping stations and fully automated packaging systems, which machine also provides for weighing a package after it is wrapped such that labels reflect only true weights, and accordingly, true prices.

SUMMARY OF THE INVENTION

The noted void in the prior art is filled by a package wrapping and weighing machine in accordance with the present invention wherein packages to be wrapped, weighed and labeled are fed into an infeed station of the machine from an operator's position. The packages are automatically wrapped and returned to a weighing scale positioned above the infeed station at the operator's position where the packages are weighed and a label is generated by a label printer adjacent the weighing scale and within convenient reach of the operator. The operator takes the label and applies it to the wrapped and weighed package as it is removed from the weighing scale. Since packages are automatically wrapped, they have a better and more consistent wrap than hand-wrapped packages and more packages can be wrapped, weighed and labeled in a given period of time than by the same operator utilizing a hand-wrap station. For those applications where an entirely automatic packaging system is not warranted, the expense of the package wrapping and weighing machine of the present invention is considerably less, thus giving an intermediate volume packager a reasonable option between a hand-wrap station and a fully automated packaging system.

In accordance with the present invention, all activities are centered around the operator's position. The operator feeds unwrapped packages from tabling means positioned to one side of the operator's station into the machine, which ejects fully wrapped and sealed packages onto a scale defining the weighing station above the infeed station to generate weight signals which are used to print a label at a position conveniently within the operator's reach. The operator takes the label and applies it to the fully wrapped and sealed package as it is removed from the weighing station and places the fully wrapped, weighed and labeled package onto the tabling means in an orderly manner ready for delivery to a display case.

The wrapping and discharge portions of the machine operate in continuing cyclic fashion so long as there are packages present anywhere in the machine. However, the infeed station operates on a demand basis. When a package is placed in the infeed station, it automatically activates an infeed conveyor to operate one cycle in synchronism with the wrapping station. The infeed conveyor then stops and waits for the next package. Meanwhile the downstream portions of the machine continue to operate. Once the machine is clear of packages all of the wrapping and conveying mechanisms stop. Thus the operator can place packages into the infeed without concern about the position of the infeed conveyor. Furthermore, he can leave the machine at any time without concern about packages in process.

In a preferred method of operation the operator feeds two packages for every three cycles of machine operation so as to maximize the throughput of the man-machine system. For operation in accordance with this method the system controller permits only two activations of the infeed conveyor in synchronism with successive cycles of the wrapping station. Thus at maximum throughput the wrapping station operates continuously, but every third cycle has no package.

It is therefore an object of the present invention to provide a package wrapping and weighing machine which can fulfill the intermediate needs between hand-wrapping stations and fully automated packaging systems wherein package weighing is performed after wrapping and sealing.

Other objects and advantages of the invention will be apparent from the following description, the accompanying drawings, and the appended claims.

BRIEF DESCRIPTION OF THE DRAWINGS

FIG. 6 shows the weighing scale and supporting shelf defining the weighing station of the package wrapping and weighing machine of FIG. 1;

FIG. 7 shows a bidirectional conveyor and a weighing scale oriented to one side of the conveyor and a supporting shelf for connecting the bidirectional conveyor and weighing scale to the package wrapping and weighing machine of FIG. 1, and FIG. 8 shows the operation of a film severing and clamping arrangement for severing film on the fly with a heated element.

DETAILED DESCRIPTION OF THE INVENTION

Figure 1:
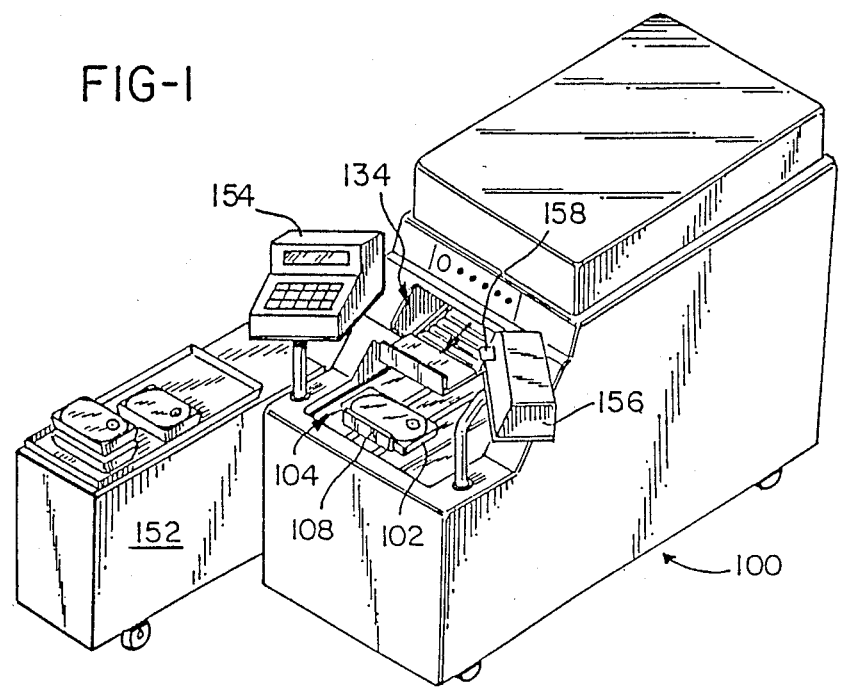
FIG. 1 is a perspective view of a package wrapping and weighing machine embodying the invention of the present application.

The general operation of a package wrapping and weighing machine 100 incorporating the present invention will be described with reference to FIGS. 1-5. A package 102 comprising, for example, meat, produce or other food products placed upon a tray is to be wrapped in stretchable heat-sealable film, weighed and labeled for attractive display. The package 102 is placed in a package infeed station 104 from which it is conveyed to a package wrapping station 106 by first conveyor means which comprise package pushers 108.

Figure 3:
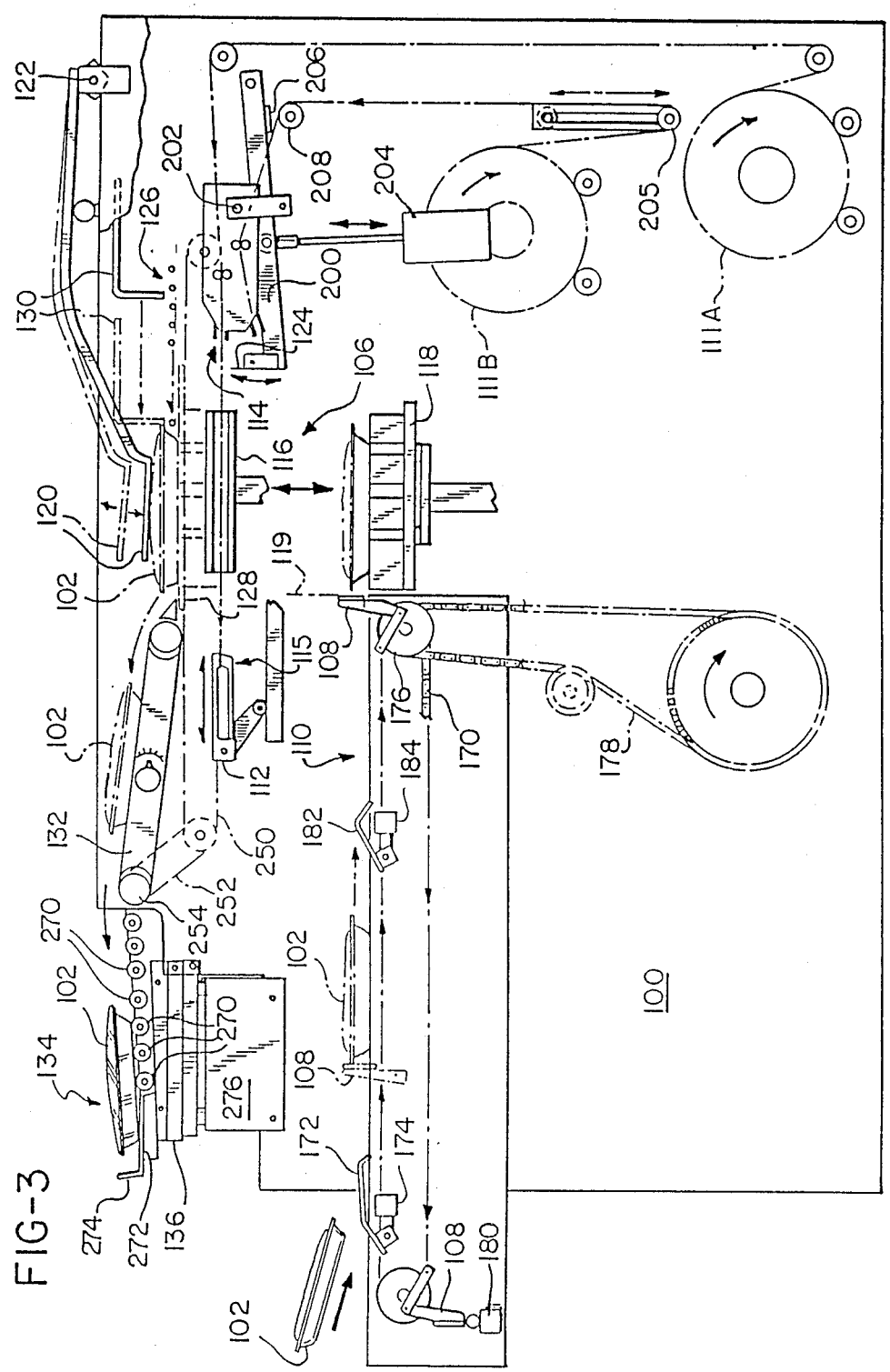
FIG. 3 is a diagrammatic vertical cross-section taken generally along the longitudinal center line of the package wrapping and weighing machine of FIG. 1.
Figure 4:
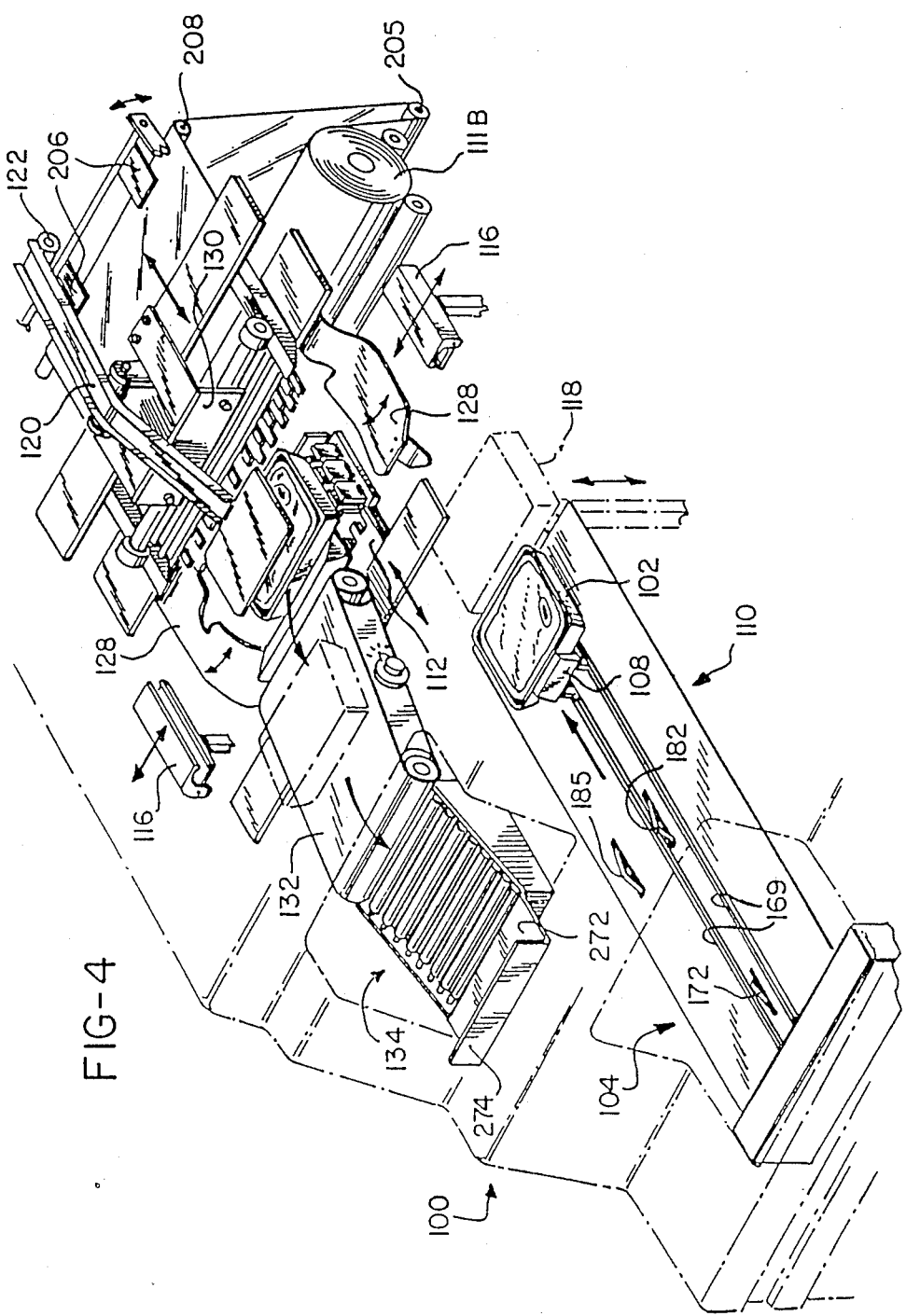
FIG. 4 is a perspective schematic view of the wrapping and weighing machine of FIG. 1.

The package 102 is carried along a package entryway 110 which includes the package infeed station 104 and extends to the package wrapping station 106. As the package 102 is conveyed along the package entryway 110 by one of the package pushers 108, a film gripper 112 has been advanced to a fixed film end engaging position 114 where the end of a continuous source or roll 111 of film is engaged by the gripper 112 and drawn into the machine 100 by retraction of the gripper 112 to the left as shown in FIG. 3 to a fixed film draw position 115. Accordingly, the film initially drawn by the film gripper 112 is of a single fixed length.

As the package 102 enters the machine 100, the width and length characteristics of the package 102 are measured to determine the width of the film to be used to wrap the package and the time during the machine wrapping operation at which the film being used to wrap the package 102 is severed from the continuous roll 111 of film, respectively, as will be described hereinafter. It is noted that, in the illustrated embodiment of the package wrapping and weighing machine 100, the width of a package refers to the package dimension across the machine and the length refers to the package dimension as fed into the machine.

The film initially drawn into the machine 100 is held in tension by the film gripper 112 and is taken by side clamps 116 which engage opposite sides of the film and stretch it outwardly toward the sides of the machine 100. By this time, the package 102 has been positioned on a package elevator 118 at a package registration edge 119 defined by one of the package pushers 108, as shown in FIG. 3. The package 102 is then elevated through the plane of the prestretched film and engages a package holddown 120. The package holddown 120 is shown in solid lines in its lowermost position in FIG. 3 and is readily removable from its mounting 122. The mounting 122 also permits the holddown 120 to pivot freely upwardly as shown in dotted lines by an amount determined by the height of a package being wrapped.

As noted, film drawn by the gripper 112 is of a fixed length since the film gripper 112 moves between the fixed film end engaging position 114 and the fixed film draw position 115. To accommodate various heights and lengths of packages to be wrapped by the machine 100, any additional film required is drawn from the continuous roll 111 of film as the package is wrapped. A first addition to the film drawn by the gripper 112 is drawn as the package is elevated through the plane of the prestretched film which is engaged by the film gripper 112 and the side clamps 116. The first additional amount of film drawn, if any, corresponds to the height of the package. Hence, a low package may draw substantially no additional film during elevation, while a high package may draw considerable additional film.

The film drawn into the machine 100 is ultimately severed by a heated member 124 and the film is folded under the package 102 by a rear underfolder 126 and side underfolders 128 which are activated in synchronism with the rear underfolder 126. The underfolder 126 is referred to as a rear underfolder since as the package is ejected from the wrapping station 106, the side of the package adjacent the registration edge 119 is the forward or leading side of the package, and hence, the underfolder 126 is at the rear side of the package. The general operation of the rear underfolder 126 and side underfolders 128 are well-known in the art and fully described in U.S. Pat. No. 4,505,092, which is incorporated herein by reference. As previously noted, the rear edge of the film extending from the continuous roll 111 of film is severed at a time within the wrapping operation determined by the length of the package being wrapped.

Sufficient film is required for the film to be underfolded in an overlapping fashion on the bottoms of packages such that the packages can be heat-sealed. In the case of packages which have a short length, the heated member 124 severs the film immediately prior to engagement of the film by the rear underfolder 126 since sufficient film has already been drawn into the machine 100 to properly overlap on the bottom of the package. In the case of packages which are greater in length, the rear underfolder 126 will engage the film and start underfolding the rear of the film prior to severance of the film from the continuous source of film. In this way, the rear underfolder 126 draws a second addition to the film drawn by the gripper 112, as necessary, to provide complete overlapping of the underfolded film on the bottoms of longer packages. The package 102 with a film section thus drawn and underfolded on three sides is pushed out of the wrapping station 106 by a package pusher 130.

As the package 102 is pushed from the wrapping station 106 by the package pusher 130, the originally gripped free end of film is released by the film gripper 112 and folded under the package 102 by second conveyor means for carrying the package 102 from the wrapping station 106 to a weighing station 134. In the illustrated embodiment, the second conveyor means comprises a heat-sealing conveyor 132 and the weighing station 134 comprises a scale 136, as best shown in FIG. 6.

Figure 2:
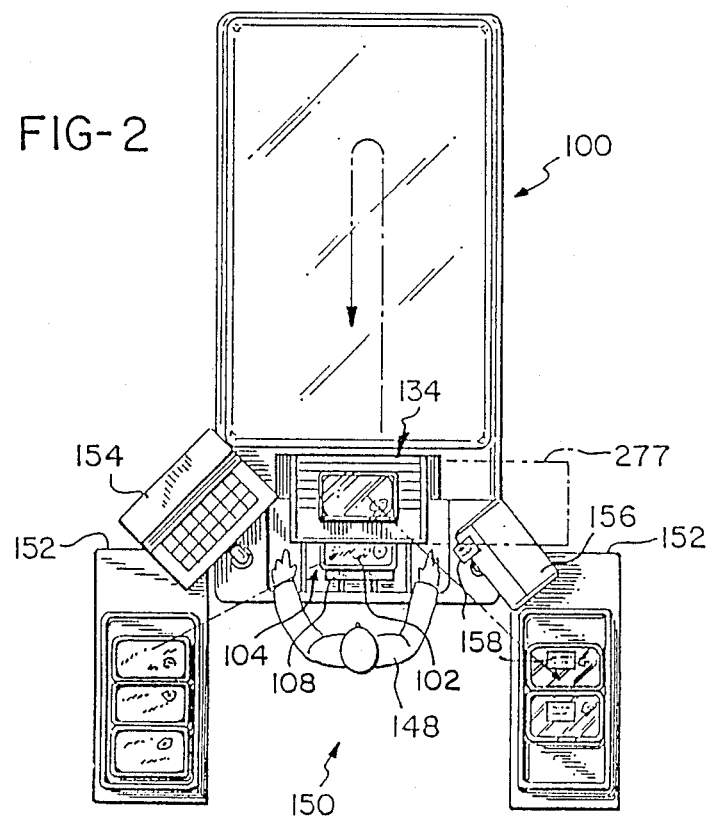
FIG. 2 is a plan view of the package wrapping and weighing machine of FIG. 1 showing the convenient operation and ergonomics for an operator of the machine.
Figure 5:
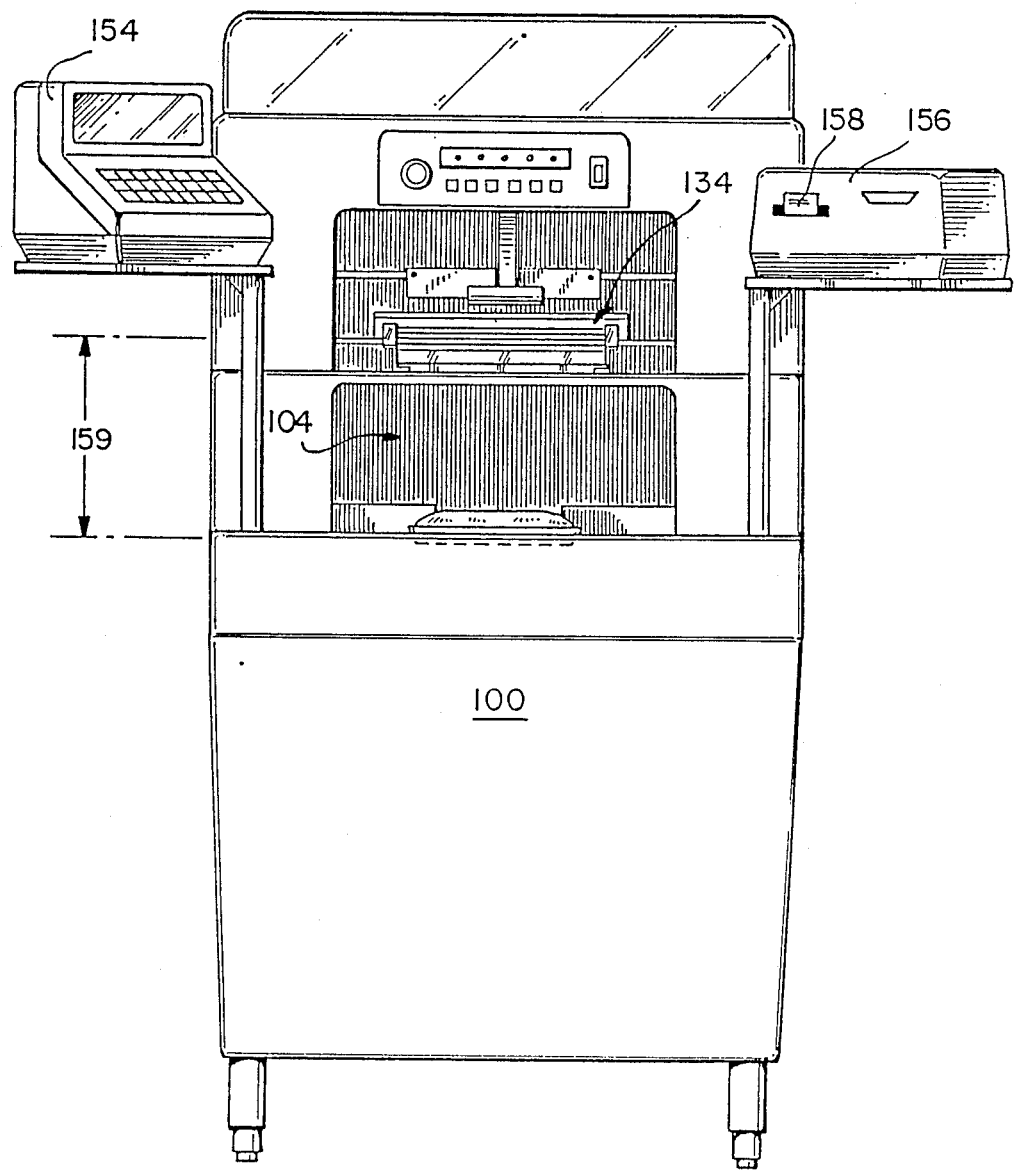
FIG. 5 is a front view of the wrapping and weighing machine as seen from the operator's position.

The convenient operation of the machine 100 can best be seen by reviewing FIGS. 1, 2 and 5. An operator 148 is shown in the operator's position 150 in FIG. 2 facing the machine 100 in front of the package infeed station 104. Tabling means comprising rolling carts 152 or the like are positioned on one or preferably both sides of the operator 48. Typically, unwrapped packages are positioned to the left of the operator 148 beneath and/or adjacent a commodity identification/pricing terminal 154 within easy reach of the operator 148. The operator 148 takes unwrapped packages from a platter supported upon the tabling means or cart 152, preferably on the left-hand side of the operator 148, and places them into the infeed station 104. The packages are carried to the wrapping station 106, wrapped and ejected onto the weighing station 134. At the weighing station 134, the packages generate weight signals which are passed to a label printer 156 positioned to the right side of the operator's position 150.

As soon as a package comes to rest on the scale 136 of the weighing station 134 and the scale 136 stabilizes, a price label 158 is generated by the label printer 156 and presented in easy reach of the operator 148. The operator 148 removes the price label 158 from the label printer 156 and applies it to the package as it is removed from the weighing station 134. The wrapped, weighed and labeled package is then placed in an orderly fashion on a platter supported upon the tabling means or cart 152, preferably on the right-hand side of the operator 148. While tabling means on both sides of the operator 148 are preferred, single tabling means can be used where space is limited.

It is apparent that at least two packages can be fed through the machine consecutively since the operator can remove the first package and label it with the label 158 prior to the second package being ejected onto the weighing station 134. Of course, a large variety of operating sequences are available depending upon the operator's preference. The actual speed of operation will depend upon the experience and ability of the operator; however, typically, a wrapping speed of 16–20 packages per minute is possible.

To make the machine 100 ergonomically advantageous for operators of a wide range of heights, the vertical separation 159 between a package supporting surface of the infeed station 104 and a package supporting surface of the weighing station 134 does not exceed 12 inches. See FIG. 5. Further, the weighing station 134 is offset from the infeed station 104 toward the wrapping station 106 to facilitate placement of packages into the infeed station 104. With the compact spacing between the infeed station 104 and the weighing station 134, the weighing station 134 is within convenient reach of the operator 148 for manually weighing packages which may be too large to be wrapped by the wrapping portion of the machine 100, or which need to be repriced for mark-downs and the like, but do not need to be rewrapped.

The first conveyor means for carrying packages from the infeed station 104 to the wrapping station 106 will now be described with reference to FIG. 3. In the illustrated embodiment, the first conveyor means comprises a pair of package pushers 108. The package pushers 108 extend above the package entryway 110 through slots 169 for engaging and pushing packages along the entryway. The package pushers 108 are carried on a circulating chain 170 which is located beneath the package entryway 110 and activated to carry a package from the infeed station 104 to the wrapping station 106 only when a package has been placed in the package infeed station 104. To this end, a package sensing element 172 is spring-biased to extend above the surface of the package infeed station 104 and engages a package presence sensing switch 174. When a package is placed into the infeed station 104, the sensing element 172 is depressed to activate the sensing switch 174 and signal a control circuit that a package is present.

The chain 170 is driven through a combination clutch/brake 176 from a continuously circulating chain 178 which is driven from the main drive mechanism of the wrapping machine in accordance with well-known wrapping art. See, for example, U.S. Pat. No. 4,505,092. The clutch portion of the combination clutch/brake 176 is activated to drive the chain 170 when a package is present in the package infeed station 104 as signaled by the sensing switch 174, and the operating position or phase of the wrapping portion of the machine 100 is at a proper stage such that the first conveyor means is synchronized with the remainder of the machine 100.

This is determined by the control for the machine which will activate the clutch portion of the combination clutch/brake 176 only when the switch 174 is activated and a designated machine phase or count is indicated.

At this time, the package pusher 108, shown to the left of the first conveyor means in FIG. 3, is rotated up into a package pushing position to engage the package 102 in the infeed station 104 and push it to the registration position 119 on the elevator 118 as shown in FIG. 3. The registration position 119 is defined by the second package pusher 108 moving to the left end of the conveyor where it engages a conveyor stop switch 180 which signals the machine controller to disengage the clutch portion of the combination clutch/brake 176 and activate the brake portion thereof. By utilizing a combination clutch and brake to control the operation of the package infeed conveyor, synchronization of the infeed conveyor with the remainder of the wrapping machine is assured and the registration of packages by means of the package pushers 108 is accurately and reliably controlled.

Clutch/brake 176 preferably comprises a wrap spring clutch having an input hub and an output hub interconnected by a wrap spring. The wrap spring normally engages both hubs so that the output hub follows the input hub. There is a control tang at one end of the spring which projects outwardly for restraining engagement by an actuator comprising a solenoid connected to the machine controller. When the control tang is engaged by the actuator the two hubs are rapidly disengaged, and the chain 170 is deactivated. The embodiment of the invention illustrated and described herein uses an SA Series solenoid actuated wrap spring clutch sold by Warner Electric Brake and Clutch Company of South Beloit, Ill.

In the preferred embodiment wrapping station 106, heat-sealing conveyor 132 and weighing station 134 operate at a speed of 30 packages per minute and continue to operator so long as packages are present in the machine. Wrapping station 106 and heat-sealing conveyor 132 are inactivated whenever they go through 6 cycles with no new package being placed into infeed station 104. Further in the preferred embodiment, clutch 176 is never activated for more than two consecutive wrapping cycles. If packages are rapidly fed into infeed station 104, then the activation of clutch 176 will be skipped every third cycle. This interrupts the package stream which is flowing to weighing station 134, thereby giving the operator an opportunity to perform the hand labeling operation. Thus the operator feeds a first package, followed by two more packages in succession. The machine processes two of these packages and thereafter places an empty spot in the stream. Meanwhile the operator labels two packages and feeds two more to the machine. It has been found that such cycle skipping maximizes the operating efficiency of the semiautomatic man-machine system, as described.

In the illustrated embodiment, a package length sensing member 182 is spring-biased above the surface of the package entryway 110 such that package length, i.e., the dimension of the package as fed into the machine 100, can be determined by the length sensing member 182 being engaged which activates a length sensing switch 184. The width of the package, i.e., either wide or narrow, can be sensed by a width sensing member 185 placed in the package entryway 110, which activates a switch (not shown) under the entryway 110 (see FIG. 4). Alternatively, package width can be determined by means of a pair of pivotally mounted sensing arms as disclosed in U.S. Pat. No. 4,505,092, by electric sensing eyes or by any other of a variety of width sensing arrangements known in the prior art. Package width is used to select either narrow film from roll 111A or wide film from roll 111B.

By operating the first conveyor means only when a package is present in the infeed station 104, undue wear of the package conveyor is avoided, and more importantly, the package pushers 108 are not continuously circulating through the infeed station 104 such that packages may be more easily fed into the machine 100 by an operator. If the package pushers 108 continuously circulate through the infeed station 104, an operator may inadvertently place a package on top of a package pusher which may result in the package being dumped from the package entryway, improper wrapping, or jamming of the wrapping machine. To similarly avoid undue wear on the remainder of the machine 100, it will be stopped after a number of operating cycles, for example 6–8, if no package is placed into the entryway 110.

As previously noted, the length of packages fed into the package wrapping and weighing machine 100 determines the time in the wrapping cycle at which the wrapping film is severed from the continuous roll 111 of film. In the case of a package having a short length, sufficient film is drawn into the wrapping machine 100 by the fixed stroke of the film gripper 112 and the elevation of a package into the prestretched film such that the film may be severed at a time in the wrapping operation immediately preceding engagement of the film by the rear underfolder 126. Most short packages would be wrapped in film from the narrow film roll 111A; however, some short but wide packages could be wrapped in film from the wide film roll 111B.

Film is severed from the continuous rolls 111A, 111B by means of the heated member 124 which is mounted on one end of a pair of pivotally movable cutter bars 200. The bars 200 are pivoted about an axis 202 by means of a solenoid 204 to elevate the heated member 124 into engagement with the film which has been or is being drawn into the machine 100. In the case of the narrow film roll 111A, as shown in FIG. 3, the film is stopped and under tension due to the prestretching and elevation of the package into the film. When the narrow film is thus severed by the heated member 124, it retracts approximately ¼-inch from the severance point such that it does not rest against and foul the heated member 124, and yet the free end is 2 available to the gripper 112.

In the case of the wide film roll 111B and a long package, additional film must be drawn by the rear underfolder 126 to provide sufficient film for an overlapping closure of the film sheet on the bottom of the package 102. In this instance, wide film would be used from the roll 111B and it is drawn at a rapid rate by the rear underfolder 126. To accommodate this rapid film draw, a dancing roller 205 can float upwardly during film feed from the wide film roll 111B. Since the wide film is being drawn rapidly from the roll 111B as the film is severed by the heated member 124, the film can slide over the heated member 124, tending to result in a jagged cut which is unsightly and can interfere with the operation of the film gripper 112. Such a jagged cut and the inertia of the film could result in parts of the film end resting against the heated member 124 after it is severed to thereby collect on and foul the heated member 124.

To overcome this problem, film brake pads 206 have been provided at the ends of the cutter arms 200 opposite to the heated member 124 to engage the wide film at an idler roller 208. The film brake pads 206 are oriented relative to the idler roller 208 such that they engage the film a short time before the heated member 124 engages and severs the film. In this way, the film is stopped and additional tension is placed on the section of film between the severing point defined by the heated member 124 and the idler roll 208. The stopped film is thus cleanly severed and the film end is retracted from the heated member 124 to prevent engagement of the film end with the heated member 124 after severance. The film clamping operation is being illustrated in FIGS. 3, 4 and 8. While the heated member 124 is preferred for film cutting, mechanical cutting by means of a fast-operating serrated knife or the like is possible.

The operating cycle of the machine 100 in accordance with the present invention includes a computerized controller which bases machine operation on clock counts ranging from zero to 255 similar to the operating counts in U.S. Pat. No. 4,505,092. As previously noted, the length of a package is utilized to determine the operating time of the film severing device of the machine 100 to ensure sufficient film is drawn to overlappingly cover the bottoms of packages being wrapped. In one working embodiment, such severing times have ranged from a clock count of 200 for a small, short package which is wrapped in narrow film from the roll 111A and severed prior to engagement of the rear underfolder 126 with the film, to a clock count of 216 which occurs at a time when the rear underfolder 126 has engaged and is pulling additional wide film from the roll 111B. This variation in severing times coupled with variable package heights results in film lengths ranging from approximately 13 inches to approximately 27 inches.

It should be apparent that the cutoff times can be designated substantially in direct correspondence to package lengths, or a number of package length zones can be defined with corresponding cutoff times designated for each of the zones. While it is preferred to sense package lengths as illustrated by means of the package length sensing member 182 and length sensing switch 184, it also is possible in accordance with the teachings of the present application to have an operator input package lengths such that an operator would control the film severing time by segregating packages into package length groups and designating the appropriate group length prior to wrapping, weighing and labeling those groups of packages.

After a package has been elevated into the pre-stretched film which is then severed at the appropriate time based on package length and underfolded by means of the rear underfolder 126 and the side underfolders 128, the thus partially wrapped package is engaged by the package pusher 130 to eject the package onto the exit conveyor which, in the illustrated embodiment, comprises a heat-sealing conveyor 132. Preferably, the package gripper 112, the package pusher 130 and the heat-sealing conveyor 132 are all controlled by a single chain 250 which is reciprocally driven by means of a cam and lever arrangement (not shown) from the main drive of the machine 100.

The heat-sealing conveyor 132 is driven by means of a secondary chain 252 and a one-way clutch 254 such that the heat-sealing conveyor 132 operates only in one direction which is to move packages positioned thereon to the weighing station 134 as shown in FIG. 3. By utilizing the intermittently driven chains 250 and 252 to drive the heat-sealing conveyor 132, the conveyor is intermittently operated in synchronism with the package pusher 130 to move the last-wrapped package toward the weighing station 134 prior to receiving the next package which is to be sealed by the heat-sealing conveyor 132. This intermittent operation also defines a fixed sealing time for each of the packages positioned on the heat-sealing conveyor 132 to help ensure thoroughly and consistently sealed, and hence, wrapped packages by operation of the machine 100.

The intermittent operation of the heat-sealing conveyor 132 ejects a wrapped and sealed package onto the weighing scale 136 which defines the weighing station 134. As best shown in FIG. 6, the weighing scale 136 preferably comprises a passive conveyor made up of a plurality of freely rotating conveyor rollers 270 which are terminated by a package braking surface 272 having a generally upwardly directed package stop 274 at its distal end to ensure that packages remain on the weighing platter. As shown in FIG. 3, most packages are stopped by the braking surface 272 such that they do not engage the upwardly directed package stop 274. Ideally, the braking surface 272 should be maintained in a clean condition such that for the largest and heaviest packages to be wrapped, the forward package edge would be closely adjacent and maybe just contact the upwardly directed package stop 274.

In any event, once a package has been stably positioned upon the weighing scale 136, stable weight signals are generated and passed to the label printer 156 where a corresponding pricing label 158 is generated and available for the operator 148 to place onto the wrapped, sealed and weighed package as it is removed from the weighing station 134. The preferred form of weighing scale is mounted on a supporting shelf 276.

A similar weighing scale support shelf 277 is shown in FIG. 7 wherein a weighing scale 137 has been positioned to one side of the machine 100, which positioning may be desirable for certain applications and is indicated in dot-dash lines in FIG. 2. In this embodiment, a bidirectional conveyor 278, a passive 90° conveyor (not shown), or the like is positioned in alignment with and immediately above the infeed station 104. Accordingly, as a package is ejected by the intermittent operation of the heat-sealing conveyor 132, the package is conveyed through the position immediately above the infeed station 104 and then to one side or the other of the machine 100 where it comes to rest upon the weighing scale 137. It should be apparent that the terminal 154 and the label printer 156 can be positioned on either side of the machine 100, and hence, the weighing scale 137 could also be positioned to either side of the machine 100.

There are many additional advantages to the package wrapping and weighing system in accordance with the present invention. For example, when the packages are removed from the weighing station 134 and hand-labeled by the operator 148, they can be directly placed in an orderly fashion upon a package supporting platter which is, in turn, supported upon one of the carts 152. In this way, the wrapped, weighed and labeled packages are ready to be carried to and placed in a display case. In automatic weighing and labeling machines of the prior art, packages are typically dumped into a bin, which can tend not only to loosen the package wrapping, but also requires the additional time required to remove the packages from the bin and place them onto platters which may then be conveyed to the display case.

Another advantage of the package wrapping and weighing system of the present invention is in systems wherein the terminal 154 includes a totalizing function. That is, the terminal 154 also provides for storing totals of various products which are wrapped, weighed and labeled by the machine. In the prior art where packages are weighed before being wrapped and labeled, typically, as soon as stable weight signals are obtained, they are passed into the totalizing memory of the terminal. Thus, if a package jams in the machine, is improperly wrapped, or otherwise damaged before it can be properly labeled, the weight which has been entered into the totalizing memory of the terminal 154 must somehow be removed and the package must be re-entered into the machine. In the system of the present invention, such a package would not have been weighed at the weighing station 134, and hence, no entry would have been made into the totalizing memory which simplifies operation of the package wrapping and weighing system of the present invention.

In the illustrated and preferred embodiments of this invention, the operator feeds unwrapped packages into the machine and wrapped packages are returned to the operator for weighing and labeling. However, it is possible to utilize the novel wrapping features in a wrapping machine wherein packages are registered in the wrapping station to one side of the machine, with film being fed in from the opposite side of the machine and wrapped packages ejected to the registering side of the machine rather than being returned to the operator. In such a side film feed/package eject machine, package "length" and "width", as previously defined, would have to be interchanged; otherwise, the foregoing description would be equally applicable. Additional modifications and alternate embodiments will be apparent to those skilled in the art from a review of the above disclosure.

Accordingly, while the forms of apparatus herein described constitute preferred embodiments of this invention, it is to be understood that the invention is not limited to these precise forms of apparatus, and that changes may be made without departing from the scope of the invention which is defined in the appended claims.

What is claimed is:

1. Packaging machine comprising an input station for receiving packages to be wrapped, a wrapping station for wrapping packages placed into said input station, an output station for discharging packages wrapped at said wrapping station, first conveying means for transporting said packages from said input station to said wrapping station, second conveying means for transporting said packages from said wrapping station to said output station, sensing means for sensing the presence of a package at said input station and generating a package sensing signal, and drive means responsive to said package sensing signal for causing operation of said machine for a sufficient number of cycles to wrap and discharge said package; characterized in that said drive means comprises means for stopping said first conveying means after said package arrives at said wrapping station and restarting said first conveying means in synchronism with the operation of said wrapping station upon receipt of a new package sensing signal.

2. Apparatus according to claim 1 wherein said drive means comprises a drive motor and said conveying means comprises a chain driven by said drive motor; characterized in that said means for stopping and restarting said first conveying means comprises a clutch for engaging and disengaging said chain from said drive motor and control means for causing said clutch to cause engagement of said chain by said drive motor only when said machine reaches a predetermined phase of its operating cycle following generation of said package sensing signal.

3. Apparatus according to claim 2 wherein said control means comprises means for limiting engagement of said chain by said drive motor to two successive operating cycles of said machine.

4. Packaging machine comprising an input station for receiving packages to be wrapped, a wrapping station for wrapping packages received from said input station, an output station for discharging packages wrapped at said wrapping station, sensing means for sensing the presence of a package at said input station and generating a package sensing signal, and drive means responsive to said package sensing signal for causing operation of said machine for a sufficient number of cycles to feed, wrap and discharge said package; characterized in that intermittently-operated first conveying means is provided for transporting a package from said input station to said wrapping station in a first machine cycle, second conveying means is provided for transporting said package from said wrapping station to said output station in a second and successive multiple machine cycles, and further characterized in that said drive means comprises means for stopping said first conveying means after said package arrives at said wrapping station at the end of a first machine cycle and continues operation of the second conveying means through additional machine cycles until the package is completely wrapped and discharged at said output station.

5. A packaging machine comprising:
a wrapping station for wrapping packages in stretch film,
output conveying means for carrying said packages away from said wrapping station after wrapping,
drive means for continuing cyclic operation of said wrapping station and said output conveying means,
an input station for receiving said packages,
sensing means for sensing the presence of one of said packages in said input station, and
normally stationary input conveying means responsive to said sensing means for carrying said one package from said input station to said wrapping station in synchronism with the operation of said wrapping station.

6. Method of wrapping packages comprising the steps of:
(1) manually placing a first package into an input station of a wrapping machine,
(2) manually placing second and third packages into said input station,
(3) conveying said first and second packages at predetermined timed intervals from said input station to a wrapping station in said wrapping machine,
(4) operating said wrapping station to wrap said first and second packages in succession and thereafter perform a third wrapping cycle with no package present, (5) conveying said first and second packages in succession from said wrapping station to an output station of said machine,
(6) weighing said first and second packages at said output station,
(7) manually labeling said first and second packages and removing them from said machine, and
(8) repeating aforesaid steps (2) through (7) a plurality of times.

* * * * *